United States Patent [19]

Studtmann

[11] 4,027,226
[45] May 31, 1977

[54] BIPOLAR INVERTER WITH INDUCTION GENERATOR

[75] Inventor: George Henry Studtmann, Mount Prospect, Ill.

[73] Assignee: Borg-Warner Corporation, Chicago, Ill.

[22] Filed: June 27, 1975

[21] Appl. No.: 590,883

[52] U.S. Cl. .............................. 321/47; 321/45 C; 321/61

[51] Int. Cl.² ................ H02M 7/757; H02M 5/297

[58] Field of Search ............ 321/5, 45 C, 47, 69 R, 321/60, 61, 64; 322/20, 27, 28, 47, 60, 94

[56] References Cited

UNITED STATES PATENTS

| | | | |
|---|---|---|---|
| 3,392,318 | 7/1968 | Huntzinger | 321/45 C |
| 3,707,665 | 12/1972 | Gyugyi | 321/5 |
| 3,832,625 | 8/1974 | Gyugyi | 322/27 X |
| 3,931,563 | 1/1976 | Stacey | 321/45 C |

Primary Examiner—A. D. Pellinen
Attorney, Agent, or Firm—James J. Jennings

[57] ABSTRACT

A bipolar inverter has power switches connected such that the inverter can be energized with a d-c voltage of either polarity, or by an a-c voltage. Each power switch of the bipolar arrangement can include inverse-parallel connected thyristors, an individual triac, or a diode bridge with a thyristor connected across the bridge. A commutation circuit for a bipolar inverter is described. A single power switch also has utility as a power transfer component in addition to its use with an additional power switch in one leg of a bipolar inverter. Different circuit implementations for the bipolar inverter are described, including use with an induction generator, a heterodyne frequency converter, and a power regeneration system.

12 Claims, 18 Drawing Figures

Unfiltered Output Voltage

Effective Output Voltage

PRIOR ART

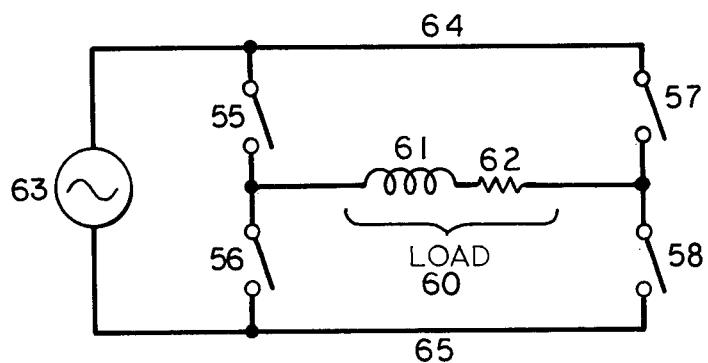
FIG. 6
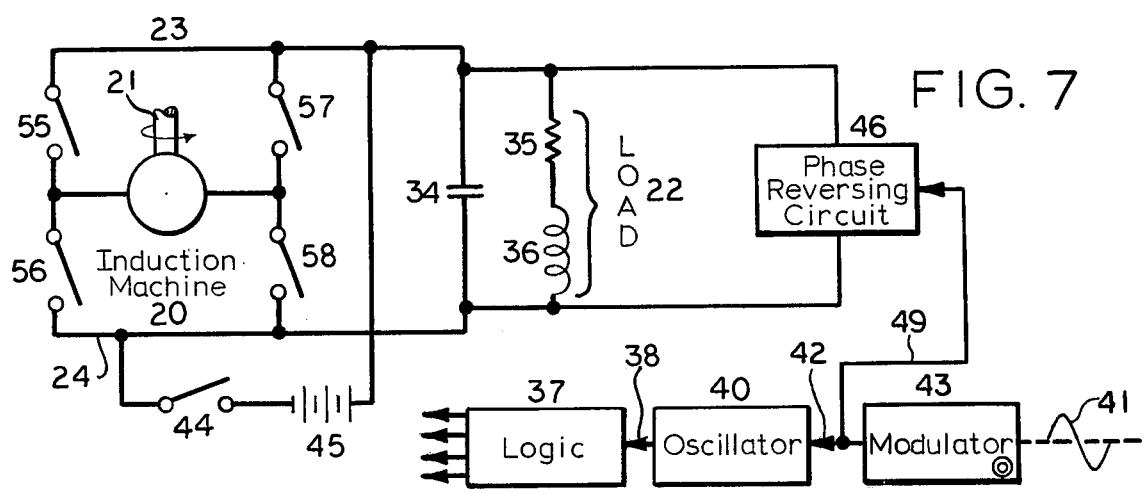
FIG. 7
FIG. 8
FIG. 9
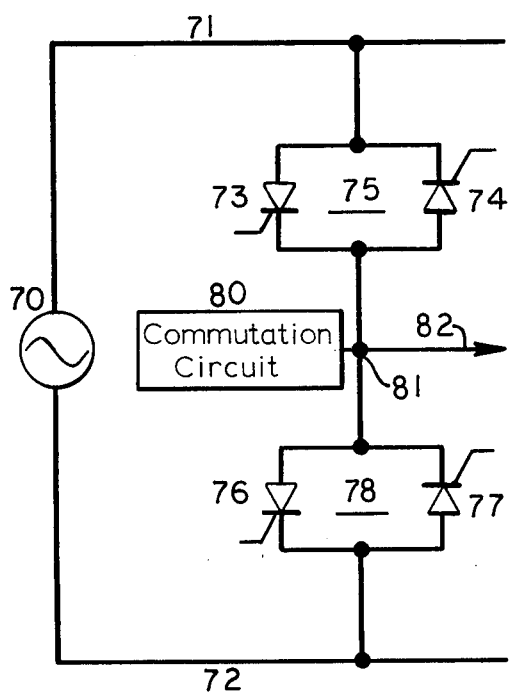
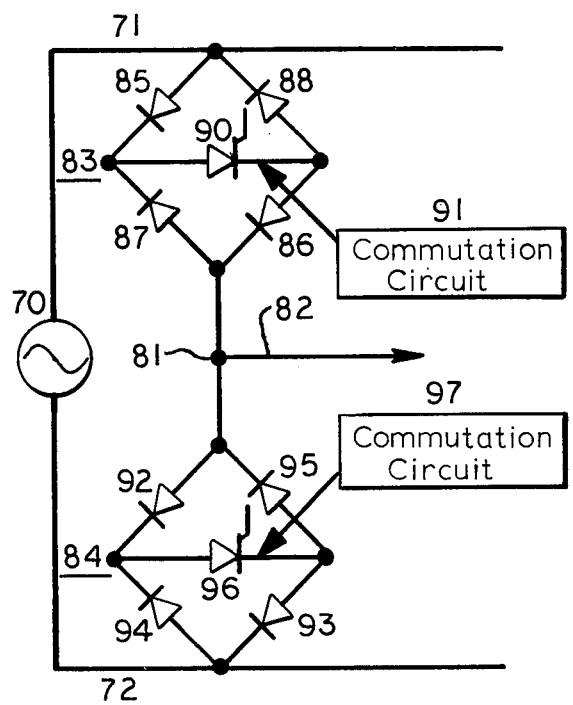

OUTPUT VOLTAGE OF B.P.I. INDUCION GENERATOR

THREE PHASE MODULATED GENERATOR $f_s$ = Frequency of Source 70
$f_i$ = Frequency of Bipolar Inverter 83, 83A, 84, 84A

THREE PHASE OUTPUT,
MODULATED GENERATOR

THREE PHASE
MODULATED BPI
OPERATING FROM
SINGLE PHASE SOURCE

BIPOLAR INVERTER WITH INDUCTION GENERATOR

BACKGROUND OF THE INVENTION

Considerable work has been done recently in the use of induction machines in conjunction with a static inverter. It has been found that a circuit similar to that of a static inverter can be coupled to the output conductors of an induction machine, and when the machine is driven as a generator, the "inverter" acts as a switching system to recycle or redirect the reactive energy from one phase winding to another of the induction machine. In this way the switching system (or inverter circuit) replaces the separate machine for excitation or the capacitor bank previously used. After this first step, it was found that the switching frequency of the thyristors in the inverter circuit could be modulated with respect to the reference or synchronous frequency at which the induction machine is operated to provide an a-c output voltage (with a d-c average level). In implementing this modulated induction generator system, it was found that the machine was derated because, when the system is modulated, the effective a-c square wave output voltage is about half that provided by the machine.

It is therefore a principal object of the present invention to provide a modulated induction generator system with substantially increased efficiency or utilization of the power supplied by the generator.

Another important object of the invention is to provide such an improved system in which the a-c output voltage does not have an average d-c level.

Still another important object of the invention is to produce an inverter circuit for use with the induction generator, which inverter circuit can be energized with a d-c voltage of either polarity, or with an a-c voltage.

A corollary consideration of this invention is to provide such an improved bipolar inverter circuit which has a new commutation circuit arrangement.

A further object of the invention is to provide such an improved bipolar inverter arrangement which finds utility with ac-to-ac power conversion through a heterodyne frequency conversion approach.

Still another important object of the invention is to provide an improved inverter which simplifies the feedback or regeneration of energy through a thyristor bridge toward a source of a-c energy.

SUMMARY OF THE INVENTION

In one aspect the invention comprises a power switch circuit, including a diode bridge arrangement and a thyristor coupled between the normal output terminals of the diode bridge. In addition the power switch circuit includes a commutating circuit for turning off the main power thyristor.

Another aspect of the invention is the use of two such power switch circuits coupled in series as one leg of a bipolar inverter, to provide for power handling in either direction irrespective of the polarity of the energizing voltage supplied to the bipolar inverter.

In addition to the bipolar inverter employing a diode bridge arrangement, the bipolar inverter can also include pairs of inverse-parallel connected thyristors to perform the switching function and conduct current in either direction.

THE DRAWINGS

In the several figures of the drawings, like reference numerals identify like components, and in those drawings:

FIG. 6 is a simplified diagram of a bipolar inverter energized from an alternating voltage;

FIG. 7 is a block diagram, partly in schematic form, of a modulated induction generator combined with a bipolar inverter;

FIG. 8 is a simplified diagram of one leg of a bipolar inverter comprising inverse-parallel coupled thyristors;

FIG. 9 is a simplified schematic diagram of another bipolar inverter, using diode bridges with thyristors connected in each bridge;

BACKGROUND DESCRIPTION

It is now known that an induction machine can be driven as a generator and, instead of a capacitor bank or a separate machine, a switching system can be connected to the induction generator terminals to recirculate the reactive energy. Such a system is described and claimed in U.S. Pat. No. 3,829,758, entitled "AC-DC Generating System", which issued Aug. 13, 1974 in the name of George H. Studtmann and is assigned to the assignee of this invention. Thereafter it was found that the frequency of switching in the switching system itself can be modulated above and below the synchronous frequency of the machine to produce an alternating output voltage which is a function of the modulating input voltage. This system is described and claimed in an application entitled "Modulated Induction Generator", filed in the names of George H. Studtmann and Harry J. Venema on Apr. 16, 1975, Ser. No. 568,746, which issued May 18, 1976, as U.S. Pat. No. 3,958,174, and which is also assigned to the assignee of this invention. To provide a starting point for the explanation of the present invention, a brief restatement of such a modulated induction generator system will be set out.

Figure 1:
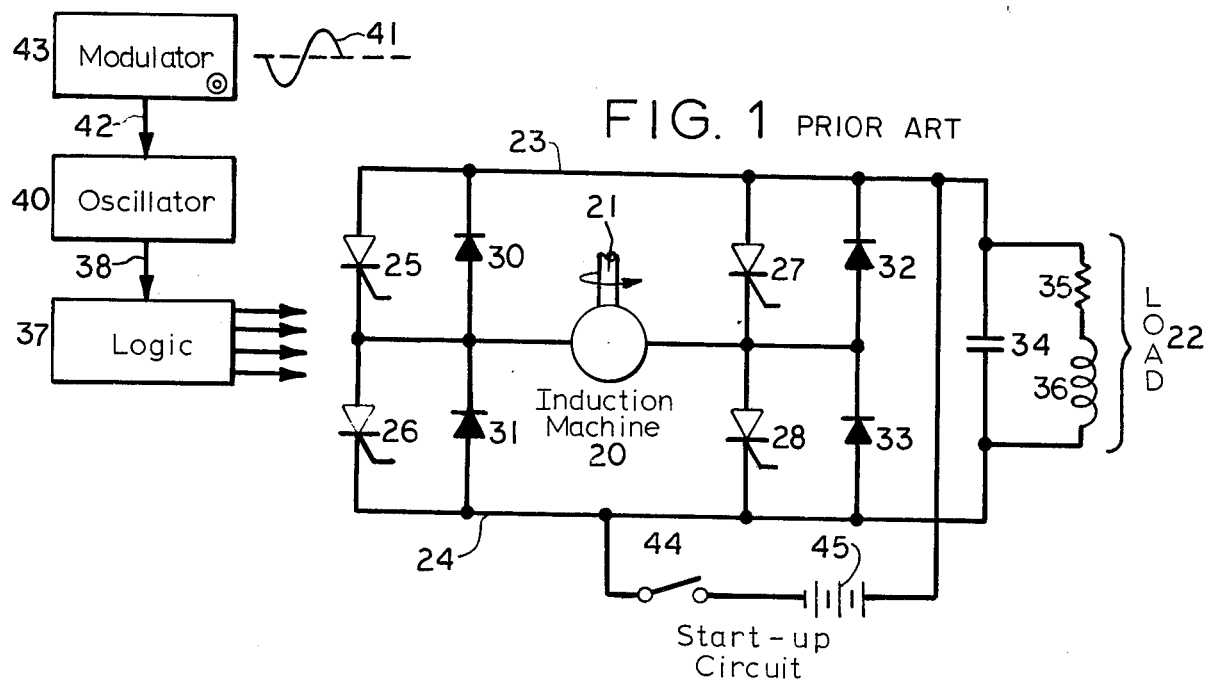
FIG. 1 is a block diagram, partly in schematic form.

A single-phase arrangement for energizing an induction machine 20, driven over shaft 21, to supply a load 22 is shown in FIG. 1. The complete bridge inverter includes conductors 23, 24 and thyristors 25, 26 27 and 28. Diodes 30, 31, 32 and 33 are connected as shown to be conductive and provide a path for reactive energy as an adjacent one of the thyristors is turned off. That is, if thyristor 25 is on and is carrying a load current, upon commutation of the thyristor (by a circuit not shown but well known and understood), reactive load current initially flows through diode 31. Such operation is also well known and understood. An output filter capacitor 34 is connected between conductors 23 and 24, and the load 22, which has a resistive component 35 and an inductive component 36, is coupled between the same conductors.

A logic circuit 37 is connected to provide separate gating or turn-on signals over its four individual output conductors to the separate ones of the thyristors 25–28, as a function of timing signals received over line 38 from oscillator circuit 40. Of course each single output line from the logic circuit may represent two lines to apply the gating signal between the gate and the cathode of each thyristor. Those skilled in the art will appreciate that other switches such as power transistors, thyratrons, ignitrons, or other switching components can also be used. Oscillator 40 receives a modulating signal, designated 41, over line 42 from a modulator circuit 43. A start-up circuit including a switch 44 and a battery 45 is provided, in the event it is needed during system start-up as explained in the patents noted above.

Figure 2:
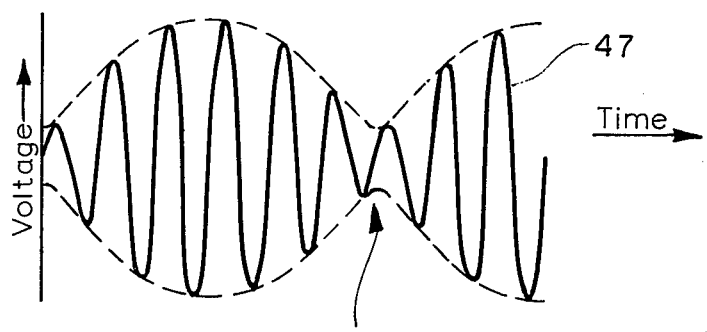
FIGS. 2–5 are graphical illustrations, useful in understanding prior art arrangements.
Figure 3:
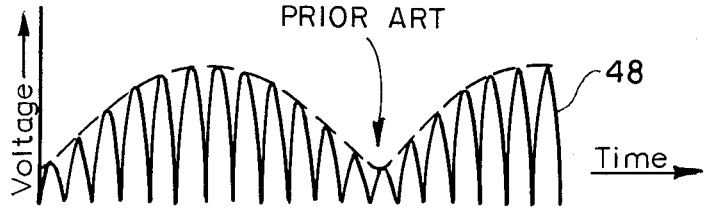

The frequency of the modulating signal 41 is maintained constant at some desired value. The modulating signal serves to vary the inverter switching frequency above and below some average frequency. The frequency of the variation is equal to that of the modulating frequency, and the amount of frequency deviation is proportional to the amplitude of the modulating signal. The net result of this process is that the generator output voltage is caused to build up and collapse in a manner shown in FIG. 2. The output voltage across the inverter terminals is that shown in FIG. 3. A more detailed explanation of this process is set out in the above-identified U.S. Pat. No. 3,958,174. Although the system there described does produce a controllable a-c output voltage, the large d-c component can be a serious drawback and this is one of the two disadvantages of the modulated induction generator system. To obtain an alternating voltage with no d-c level, the d-c component must be removed by another means, generally a large capacitor.

Figure 4:
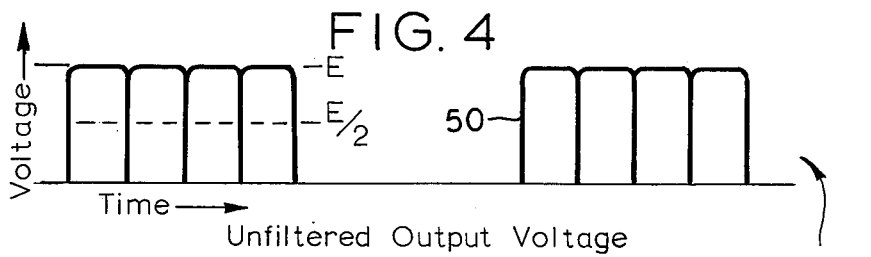
Figure 5:
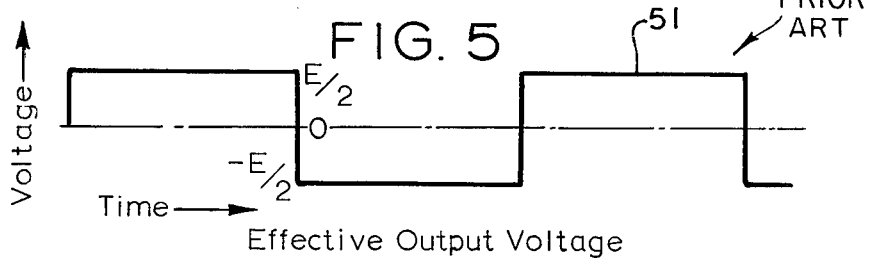

The other shortcoming of the described system is that the utilization of the generator is rather inefficient. For example, FIG. 4 illustrates the unfiltered output voltage across the d-c terminals of the inverter when used in conjunction with an induction generator, whose output voltage is assumed to be a square wave of amplitude E. After removal of the d-c component, the output voltage appears as shown in FIG. 5. As there shown, the amplitude of the square wave is reduced to E/2. If a resistive load drawing a current I were supplied from the generator acting as a normal generator, then a square wave of current would flow and a power output of EI would result. When the generator is used in the modulated system the output current and the generator current are identical. Thus, the current I flowing from the generator terminals would flow into the load, but since, as indicated by FIG. 5, the output voltage is E/2, a reduction of a-c output power by 2 to 1 is indicated. This derating or less efficient use of the generator is inherent when the modulated system uses a conventional inverter which can be supplied by a voltage of only one polarity.

GENERAL DESCRIPTION OF THE INVENTION

The shortcomings of the modulated induction generator system used with conventional inverters can be overcome by using a bipolar inverter (BPI). The term "bipolar" as used herein refers to a switching arrangement capable of providing alternating output energy to a load, when energized by d-c input energy of either polarity or by a-c input energy. A simplified arrangement of such an inverter is shown in FIG. 6.

As there shown, the thyristors or other switch components are represented by four mechanical switches 55, 56, 57 and 58. For purposes of description, closure of any switch is effective to complete a path for passing current through the switch, no matter what the polarity of the applied voltage. A load 60 includes an inductive component 61, and a resistive component 62 connected as shown. A source of a-c voltage 63 is provided and coupled to the conductors 64 and 65, to which the switches are connected. This BPI arrangement is able to pass current through the load in either direction by closure of the proper switches, and may do so with voltage of either polarity applied to its input terminals.

For example, assuming current flows from a plane of more positive potential to a plane of less positive potential, and assuming that the potential on conductor 64 is positive with respect to that on conductor 65, if switches 55 and 58 are closed, current will flow through switch 55, through the load and switch 58. If switches 55 and 58 are now opened and switches 56, 57 are now closed, with the potential difference remaining the same, the current will initially continue to flow in the same direction through the load until the inductive energy is exhausted. The current will then build up in the reverse direction through the load. Thus the direction of current flow through the load is controlled by which of the switch pairs is closed. This is also true when the potential on conductor 65 is more positive than that on conductor 64.

There are various circuit arrangements for implementing the bipolar inverter shown generally in FIG. 6. For example, each of the switches 55–58 might be a triac or some similar switch which is capable of conducting current in either direction when triggered by a gating pulse. If a triac were used as each of the switches 55–58, then each of the SCR-diode pairs (such as 25, 30) in FIG. 1 could be replaced by one of the thyristors 55–58 to provide a single-phase system as shown in FIG. 7. The commutation circuit is omitted, but those skilled in the art will understand how such a circuit is connected and operated to turn off the triacs. In this system the generator is used to its full capacity, since the output voltage would be E instead of E/2.

There are alternative circuit arrangements for implementing the bipolar inverter arrangement shown generally in FIG. 6, and more particularly with an induction machine in FIG. 7. If silicon-controlled rectifiers (SCR's) are used in place of triacs, a circuit such as that depicted in FIG. 8 can be provided. As there shown, a generator 70 is connected to provide a-c energy over supply conductors 71, 72 to one leg of the inverter. This leg could be the equivalent of the switches 55, 56 in FIGS. 6 and 7. In FIG. 8 the leg includes a first pair of inverse-parallel thyristors 73, 74 connected as shown to provide a switch 75. Another pair of inverse-parallel connected thyristors 76, 77 form another switch 78. The switches 75, 78 are coupled in series between the conductors 71, 72. A commutation circuit 80 is connected to the common connection 81, and a load conductor 82 is also connected to this same circuit point. The commutation circuit is used to turn off one of the thyristors prior to gating on of the other. For example, if thyristor 73 in the switch 75 were conducting so that current from conductor 71 was flowing through thyristor 73 and over conductor 82 to the load, the commutation circuit would be enabled to turn off thyristor 73 before thyristor 74, or either of thyristors 76 and 77, were gated on.

FIG. 9 depicts a different circuit for implementing the basic switch arrangement discussed in connection with FIG. 6. As there shown, a pair of switch circuits 83 and 84 are coupled in series between the supply conductors 71, 72. Each of the switch circuits includes a diode bridge and a thyristor. In the upper switch circuit 83, for example, four diodes 85-88 are connected in the usual bridge arrangement, and a thyristor 90 which may be an SCR is connected across the normal output connections of the diode bridge. In addition a commutation circuit 91 is shown connected to the thyristor circuit, to effect the commutation of this thyristor when desired. Similarly the lower switch arrangement 84 includes four diodes 92-95 connected in a bridge arrangement, with a thyristor 96 across the normal output connections, and a commutation circuit 97 connected to effect turn-off of thyristor 96 when it is activated.

It is apparent that when thyristor 90 is conducting, current can flow from conductor 71 through the upper switch 83 to the load conductor 82, or from conductor 82 up through the switch circuit 83 to conductor 71. Like the arrangement of FIG. 8, the upper switch 83 in FIG. 9 would be turned off before gating on thyristor 96 in the lower switch arrangement 84, and of course switch 84 would be turned off before the switch circuit 83 is again gated on. In the circuits of both FIGS. 8 and 9, the voltage from supply unit 70 can be of either polarity, and energy can pass in either direction—to the load or from the load—with these two different polarities on the reference conductors 71, 72. Thus both these arrangements are effective in increasing the efficiency of the modulated induction generator system as described above in connection with FIG. 6.

Figure 10A:
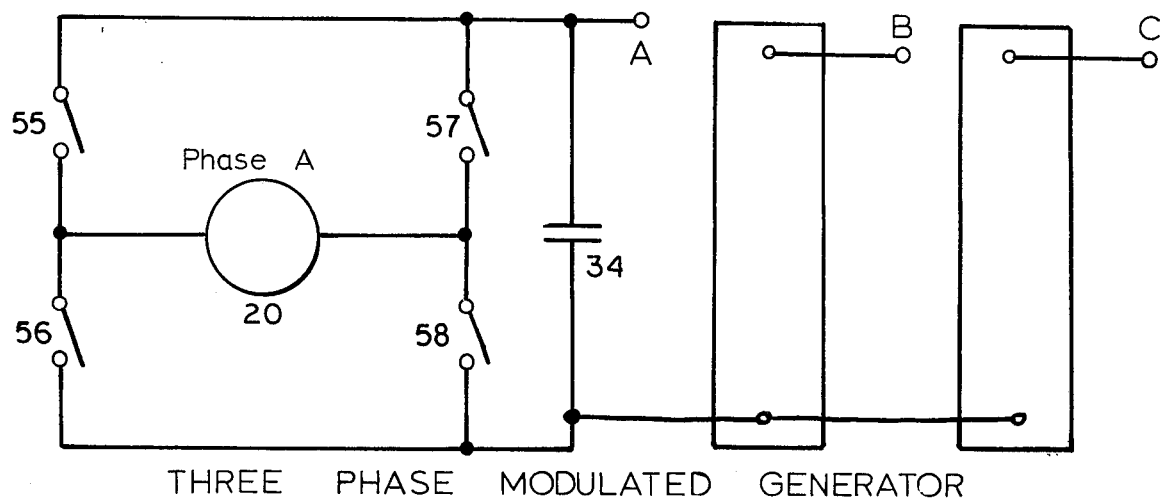
FIG. 10A is a simplified illustration of a three-phase modulated generator system, using three induction generators.
Figure 10B:
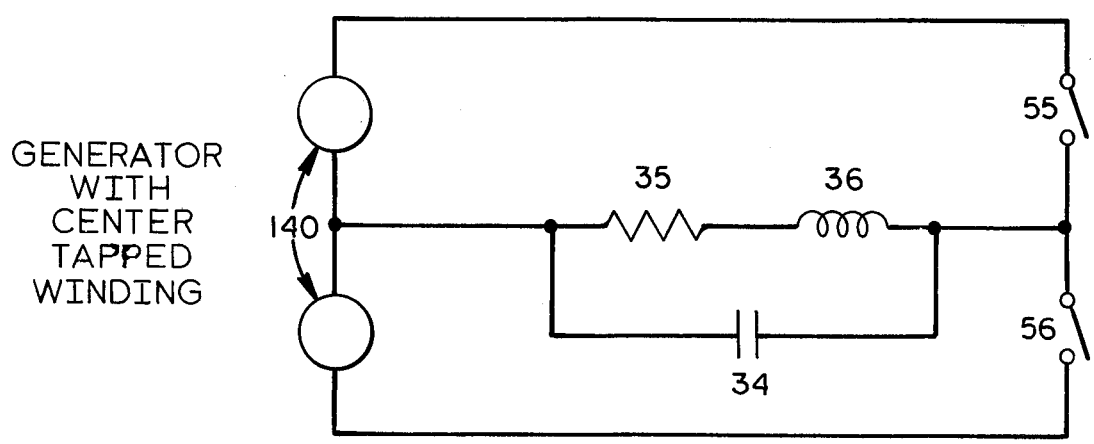
FIG. 10B is a simplified diagram of a single-phase system using a generator with a center-tapped winding.
Figure 10:
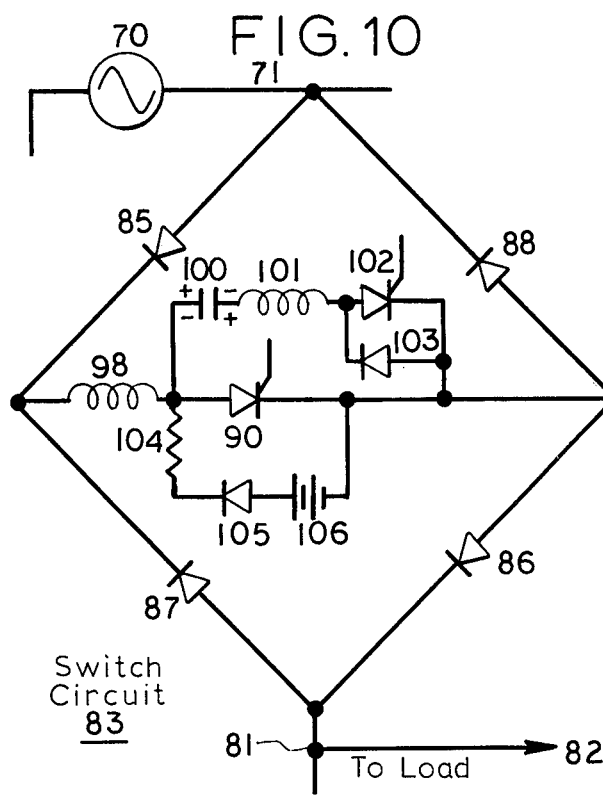
FIG. 10 is a schematic diagram of one power switch shown more generally in FIG. 9.

FIG. 10 shows the upper switch circuit 83 of FIG. 9, together with the circuit details of the commutation circuit 91. As there shown a commutating inductor 98 is coupled in series with the thyristor 90. All of the components with reference numerals from 100 to 106, inclusive, are part of the commutation circuit 91. These components include a series circuit comprised of a capacitor 100, inductor 101 and an auxiliary thyristor 102 which series circuit is connected in parallel with the thyristor 90. A diode 103 is connected in parallel with the auxiliary SCR 102 as shown. In addition the commutation circuit includes a second series circuit comprised of a resistor 104, diode 105, and a battery or external voltage source 106; this second series circuit is also connected in parallel with thyristor 90. In operation, it is initially assumed that the source 70 is providing a potential on conductor 71 which is positive with respect to that on conductor 82, and that thyristor 90 has not yet been gated on. To charge capacitor 100 initially, auxiliary thyristor 102 is gated on to complete a path for current flow from conductor 71 over diode 85, inductor 98, capacitor 100, inductor 101, auxiliary SCR 102, diode 86 and conductor 82 to the load. This charges the capacitor 100 with a voltage of the polarity indicated by the plus and minus signs above the capacitor. Auxiliary supply 106 may also charge the capacitor 100 and supplement the charging from the main source when the main source voltage is low or in the event of no-load operation. After this charge, with the first turn-on of thyristor 90, the capacitor 100 will discharge around the circuit including thyristor 90, diode 103, and inductor 101 back to the other plate of capacitor 100, providing across the capacitor a charge with the polarity such as that indicated below the capacitor. When it is desired to turn off the thyristor 90, auxiliary thyristor 102 is gated on and the capacitor 100 discharges around the loop including inductor 101, auxiliary thyristor 102, and initially the reverse direction of thyristor 90, to the other side of capacitor 100. When the thyristor 90 blocks the flow of reverse current, the commutation pulse transfers to the paths provided by diodes 85, 88 and diodes 86, 87. The capacitor 100 is then recharged with the polarity indicated above the capacitor. During a portion of the time that the diodes 85, 88 and 86, 87 are conducting, the voltage developed across inductor 98 reverse biases the main thyristor 90, which is desirable to minimize the device turn-off time. The next time that thyristor 90 is gated on, the polarity of the charge across capacitor 100 will again be reversed to prepare the circuit for the next commutation cycle.

If the capacitor 100 would not be charged to a sufficiently high value for effective commutation in the initial cycle, the auxiliary source 106 is used to provide the requisite level of energy for commutation. That is when auxiliary thyristor 102 is gated on a charging path for capacitor 100 is completed. This path extends from the battery 106 through diode 105, resistor 104, capacitor 100, inductor 101, and auxiliary thyristor 102 back to the other side of battery 106. This completes the initial charge of the capacitor 100 as described previously, and with the first turn-on of thyristor 90, the charge across the capacitor will be reversed to effect commutation in the normal way. If the operating voltage level across the supply conductors falls too low for effective commutation at any time, then the necessary charge level will be supplied from battery 106 over the circuit just described. At this time the general bipolar inverter arrangement depicted in FIG. 9, and the commutation circuit shown in FIG. 10, are believed to be best suited for practicing the invention.

TECHNICAL ADVANTAGES

Figure 7A:
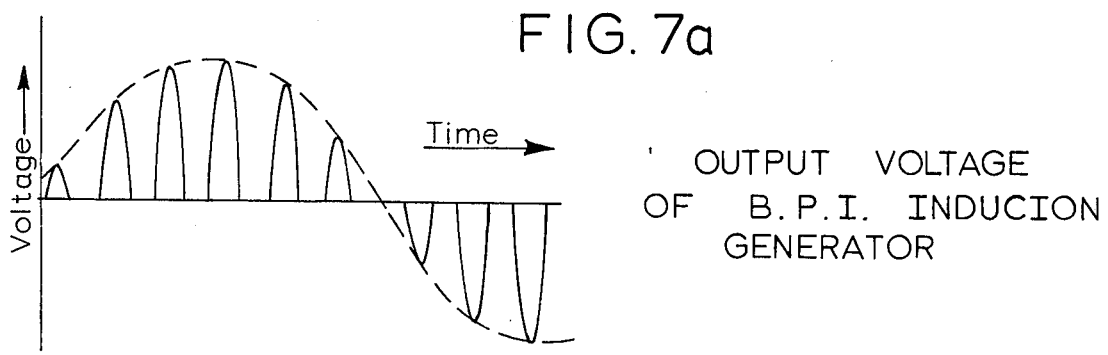
FIG. 7A is a graphical illustration useful in understanding operation of the system shown in FIG. 7.

A significant advantage of the present invention is its use in an induction generator system, as explained above, but in which the utilization of the induction machine itself is virtually doubled as contrasted with the system described in connection with FIG. 1. FIG. 7 illustrates the use of a bipolar inverter in conjunction with an induction machine to provide a controlled frequency system, and FIG. 7A illustrates the output voltage of the BPI system. Those skilled in the art will appreciate that logic circuit 37 ensures that the voltage across the inverter is a quasi-square wave, or pulse-width modulated voltage. A phase reversing circuit 46 is indicated in FIG. 7, which serves to ensure build up at each zero crossing of the wave form depicting the modulated output voltage. That is, the excitation of the machine is allowed to collapse at the end of each half cycle and some means must be used to re-excite the system. This circuit may typically consist of a small d-c source or charged capacitor which is momentarily applied to the bus terminals to re-excite the machine. If the load is sufficiently inductive, the load current will cause the system to build up again, since the load current continues to flow as voltage decays and tends to recharge the capacitor with a voltage of the appropriate polarity.

Various circuit configurations are possible using the BPI. For example, a three-phase machine can be used with a three-phase BPI to produce a single-phase output voltage having a very small ripple content. As pointed out in U.S. Pat. No. 3,829,758, capacitor may not be required for this case.

A three-phase output voltage can also be obtained by connecting three single-phase systems, as shown generally in FIG. 10A. Three isolated generators are required and the connections are made as shown. A three-phase modulator signal is applied to each inverter control circuit.

Figure 10C:
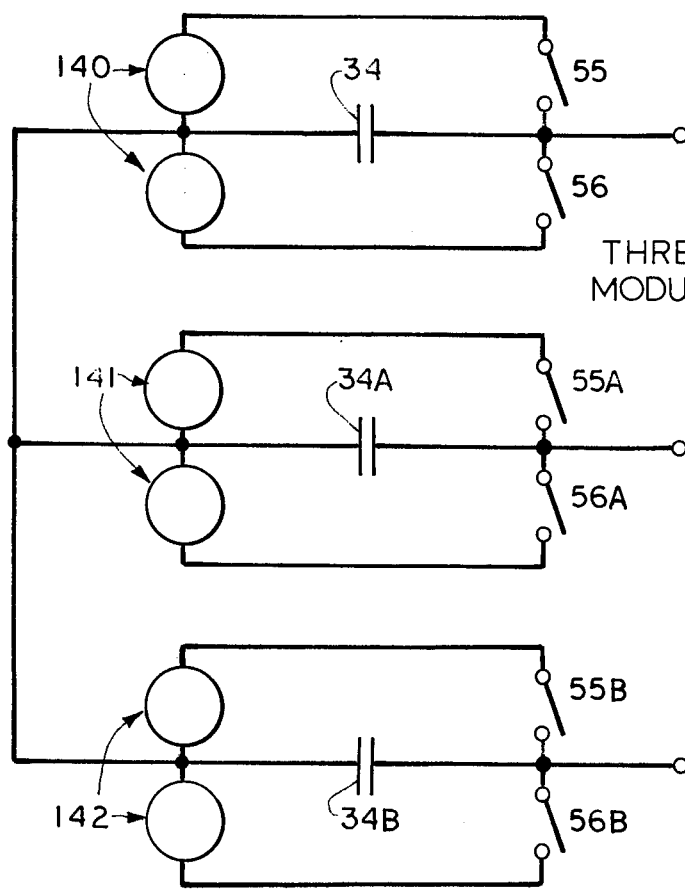
FIG. 10C is a simplified diagram of a three-phase system using three generators, each with a center-tapped winding.

The use of a center-tapped generator 140 can eliminate some of the power switches, as shown in the single-phase system depicted in FIG. 10B. FIG. 10C shows a system for producing a three-phase output voltage, using three isolated center-tapped single phase machines 140, 141 and 142. Various other configurations will become apparent to those skilled in the art.

Figure 11:
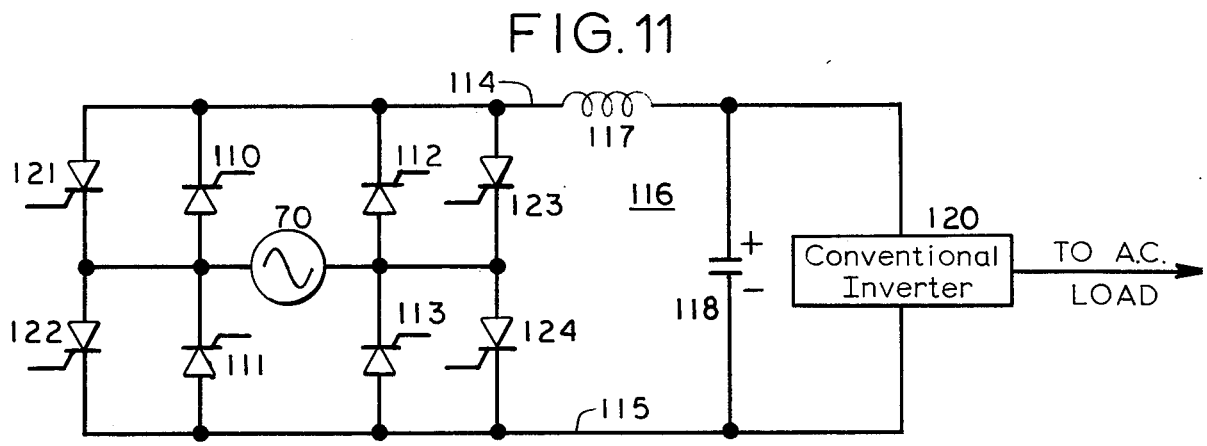
FIG. 11 is a simplified schematic diagram of a conventional arrangement for regenerating energy from a known inverter to an a-c source of energy.

Another significant area of utility for the invention is in the field of energy regeneration. Often it is desirable to pass energy back from a motor or load, which instantaneously may be operating as a generator, toward the main source of energy. Frequently this main source is one which produces an a-c voltage, which is then rectified by a circuit such as a thyristor controlled bridge, filtered in an LC filter and then applied to the inverter. Accordingly when it is necessary to pass the regenerated energy back to the source, a second full thyristor bridge is added, as shown in FIG. 11. A conventional source 70 of sine-wave voltage is connected to supply a-c energy which is rectified by means of a first thyristor bridge including the thyristors 110, 111, 112 and 113. The d-c energy thus provided is passed over the bus conductors 114, 115 and through a filter 116, which includes a series-connected inductor 117 and a parallel-connected capacitor 118, to energize the conventional inverter 120. When it is desired to pass regenerated energy backward through the conventional inverter 120 and the filter 116 toward the source 70, a second thyristor bridge including the four thyristors 121, 122, 123 and 124 must be added. The polarity of the voltage on the bus 114, 115 remains the same, as does the polarity across capacitor 118, but the direction of current flow through the filter inductor reverses in the regeneration process using a conventional inverter.

Figure 12:
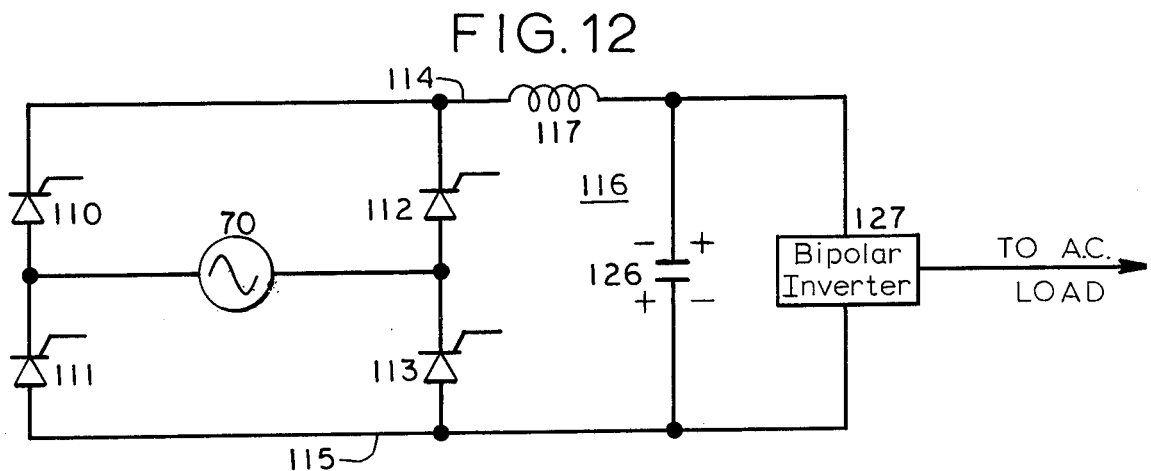
FIG. 12 is a simplified block diagram of a system including a bipolar inverter for regenerating energy back toward an a-c source.

The use of the bipolar inverter to simplify the feedback or regenerated energy is depicted in FIG. 12. It is emphasized that only a single bridge, including the thyristors 110-113, is required between the bus conductors and the source 70. In addition the capacitor 118 is replaced by a bipolar capacitor 126. In this arrangement the direction of current flow always remains the same, from the source through the filter to the bipolar inverter, while the voltage reverses across the capacitor as energy is fed back through the bipolar inverter.

Figure 13:
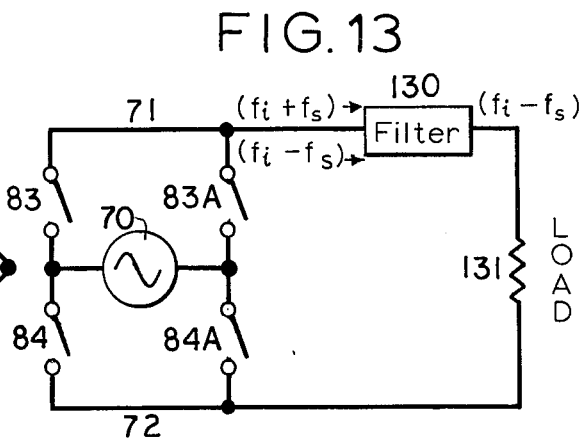
FIG. 13 is a simplified block diagram depicting a bipolar inverter used with an a-c source in a heterodyne frequency conversion system.

The bipolar inverter has another use, in the area of heterodyne frequency conversion. A general arrangement for such a converter is shown in FIG. 13, but the inverter switch circuits are shown in simplified form as the power switches 83, 84, 83A and 84A. The source 70 is providing an a-c voltage at some frequency $f_s$. The frequency of the inverter is identified $f_1$. On the bus conductors 71, 72, before the filter 130, both the sum $(f_i + f_s)$ and the difference $(f_i - f_s)$ frequencies of the inverter and the source are present. In the general example shown, filter 130 is a low pass filter and therefore blocks the higher frequency, $(f_i + f_s)$. Filter 130 could be a high pass filter and block the lower frequency $(f_1 - f_s)$. There are also harmonic frequencies generated in such an arrangement, but the system shown is readily useable to produce a frequency by the heterodyne frequency conversion method. This method can be used, by way of example, for direct ac-to-ac voltage conversion, without any intermediate d-c link, to produce a controlled frequency voltage from either a fixed or variable voltage source.

Figure 14:
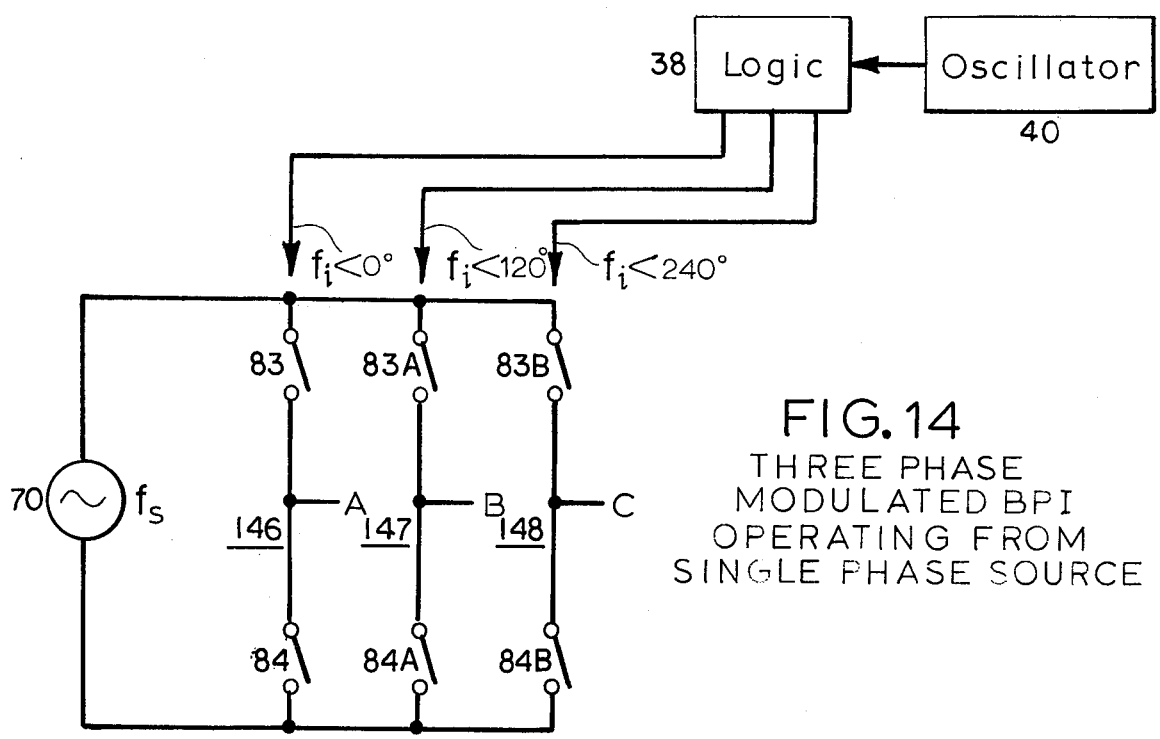
FIG. 14 is a simplified illustration of a three-phase bipolar inverter operating from a single-phase source.

A circuit for producing a three-phase a-c voltage from a single-phase source is shown in FIG. 14. A three-phase bipolar inverter having three legs 146, 147 and 148 is shown coupled to a single-phase source 70. Each leg has a pair of power switches 83, 84; 83A, 84A; and 83B, 84B. If the gating of the power switches is controlled so as to switch in a conventional quasi-square wave manner, then the voltage appearing across the output terminals will include both sum and difference components. Assuming for example that the sum components are filtered out, then the output voltage will include balanced three-phase voltages at the difference frequency.

It is further emphasized that the individual power switches, such as the circuit 83 illustrated in FIG. 10, have utility apart from connection in a bipolar inverter circuit. The circuit 83 can be used as a power switch, by way of example, between a source of energy and a load.

In the appended claims the term "connected" means a d-c connection between two components with virtually zero d-c resistance between those components. The term "coupled" indicates there is a functional relationship between two components, with a possible interposition of other elements between the two components described as "coupled" or "intercoupled". The term "power switch" includes a triac, a pair of inverse-parallel connected thyristors (such as 73, 74 in FIG. 8), a diode bridge with a thyristor and commutation circuit (such as shown in FIG. 10), and equivalent arrangements. In the diode bridge 85-88 of FIG. 10, the "load connections" are the two terminals connected to bus conductor 71 and to load conductor 82, and the "switching connections" are the terminal connected to the cathodes of diodes 85, 87 and the terminal connected to the anodes of diodes 86, 88.

While only particular embodiments of the invention have been described and claimed herein, it is apparent that various modifications and alterations of the invention may be made. It is therefore the intention in the appended claims to cover all such modifications and alterations as may fall within the true spirit and scope of the invention.

What is claimed is:

1. A bipolar inverter circuit capable of passing energy to a load irrespective of the polarity of an energizing potential difference applied to a pair of bus conductors over which energy is supplied to the inverter, comprising:

first and second power switches, each having a pair of load connections and a pair of switching connections, each power switch having one of its load connections coupled to one of said bus conductors;

third and fourth power switches, each having a pair of load connections and a pair of switching connections, each power switch having one of its load connections coupled to the other of said bus conductors;

means for coupling the other load connections of both the first switch and the third switch together, and to a first load conductor; and means for coupling the other load connections of both the second switch and the fourth switch together, and to a second load conductor, to supply undirectional energy to said load conductors whether a d-c voltage of either polarity, or an a-c voltage, is applied to said bus conductors.

2. A bipolar inverter as claimed in claim 1, and in which each leg of the inverter circuit comprises a pair of power switches, each power switch including a pair of inverseparallel connected thyristors, and a commutation circuit connected to effect turn-off of the thyristors.

3. A bipolar inverter as claimed in claim 1, and in which each leg of the inverter comprises a pair of power switches, each power switch including diode bridge with four diodes connected in a conventional rectifier configuration, a thyristor coupled between opposite connections of said diode bridge to afford conduction and non-conduction of the diode bridge in either direction as a function of the conduction and non-conduction of the thyristor, and a commutation circuit coupled to the thyristor to effect turn-off of the thyristor.

4. A modulated induction generator system for providing an a-c output voltage over a pair of bus conductors to a load, comprising:

an induction machine, having an input shaft for receiving mechanical input energy and a pair of output connections;

a bipolar inverter, including a first leg having a pair of power switches coupled in series between the bus conductors, with the common connnection between the first pair of power switches being coupled to one output connection of the induction machine, and a second leg including a second pair of power switches coupled in series between the bus conductors, with the common connection between the second pair of power switches being coupled to the other output connection of the induction machine;

a capacitor coupled between the bus conductors;

a logic circuit having a plurality of output connections for applying gating signals to the four power switches in the bipolar inverter in response to received timing signals;

an oscillator circuit connected to apply the timing signals to the logic circuit; and a modulator, coupled to the oscillator circuit, for effecting a variation in the timing signals applied to the logic circuit from the oscillator.

5. A modulated induction generator system as claimed in claim 4, and in which each of the power switches in the bipolar inverter comprises a pair of inverse-parallel connected thyristors.

6. A modulated induction generator system as claimed in claim 4, and in which each of the power switches in the bipolar inverter comprises a diode bridge circuit with a thyristor connected across a pair of the diode bridge terminals, and a commutation circuit coupled to the thyristor.

7. A modulated induction generator system as claimed in claim 4, and further comprising a phase reversing circuit, coupled between the modulator and the bus conductors, to ensure build-up of the induction machine after each zero crossing of the modulated output voltage.

8. A system for regenerating energy passed from an a-c load over a pair fo bus conductors back toward a source of a-c voltage, comprising:

a thyristor bridge circuit coupled to the source of a-c voltage and to the bus conductors for providing a unidirectional potential difference on the bus conductors;

a filter, comprising an inductor coupled in series with one of the bus conductors and capacitor coupled in parallel across said bus conductors, which capacitor is capable of being charged in either direction; and a bipolar inverter, coupled to said bus conductors, for receiving the unidirectional energy from the filter and passing a-c energy to a load, and in addition for receiving energy returning from the load for return to the bus conductors to charge the capacitor in an opposite sense than that in which it is normally charged when passing to the inverter.

9. An a-c to a-c conversion system for supplying a-c voltage to a load, comprising:

a source of a-c energy alternating at a frequency $f_s$;

a bipolar inverter coupled to said source, which bipolar inverter is connected to be switched at a frequency $f_s$;

a pair of bus conductors coupled to the bipolar inverter for receiving the sum and difference frequencies $(f_i + f_s)$ and $(f_i - f_s)$ from the inverter; and a filter circuit, coupled between the bus conductors and the load, for passing one of the sum and difference frequencies to the load and blocking the other of the sum and difference frequencies.

10. A modulated induction generator system for providing a multi-phase a-c output voltage for energizing a load, in which each phase circuit comprises:

an induction machine, having an input shaft for receiving mechanical input energy and a pair of output connections, a bipolar inverter, including a first leg having a pair of power switches coupled in series between a first pair of bus conductors, with the common connection between the first pair of power switches being coupled to one output connection of the induction machine, and a second leg including a second pair of power switches coupled in series between the bus conductors, with the common connection between the second pair of power switches being coupled to the other output connection of the induction machine, and a capacitor coupled between the bus conductors; which system further comprises a logic circuit, having a plurality of output connections for applying gating signals to the four power switches in each phase circuit of the bipolar inverter in response to received timing signals;

an oscillator circuit connected to apply the timing signals to the logic circuit; and a modulator, coupled to the oscillator circuit, for effecting variation in the timing signals applied to the logic circuit form the oscillator.

11. A modulated induction generator system for providing a multi-phase a-c output voltage over a plurality of load conductors to energize a load, comprising:

a pair of bus conductors;

means for applying single-phase a-c voltage between said bus conductors;

a bipolar inverter, in which each leg has a pair of power switches coupled in series between the bus conductors, with the common connection between the pair of power switches being coupled to one of the load conductors;

a logic circuit having a plurality of output connections for applying gating signals to the power switches in each leg of the bipolar inverter in response to received timing signals; and an oscillator circuit connected to apply the timing signals to the logic circuit.

12. A modulated induction generator system as claimed in claim 11, in which said means for applying a single-phase a-c voltage includes an induction generator.

* * * * *

UNITED STATES PATENT OFFICE
CERTIFICATE OF CORRECTION

PATENT NO. : 4,027,226
DATED : May 31, 1977
INVENTOR(S) : George H. Studtmann

It is certified that error appears in the above-identified patent and that said Letters Patent are hereby corrected as shown below:

Column 9, line 18, change "undirectional" to -- unidirectional --.

Column 9, line 29, insert -- a -- before "diode".

Column 10, line 21, insert -- a -- before "capacitor".

Column 10, line 37, change "$f_s$;" to -- fi; --.

Column 11, line 4, insert -- a -- before "variation".

Signed and Sealed this thirtieth Day of August 1977

[SEAL]

Attest:

RUTH C. MASON
Attesting Officer

C. MARSHALL DANN
Commissioner of Patents and Trademarks